US009286657B1

(12) United States Patent
Thorup, Jr.

(10) Patent No.: US 9,286,657 B1
(45) Date of Patent: Mar. 15, 2016

(54) EFFICIENT IMAGE PROCESSING USING DYNAMICALLY SIZED TILES

(71) Applicant: Mylio, LLC, Bellevue, WA (US)

(72) Inventor: David Hammond Thorup, Jr., Bothell, WA (US)

(73) Assignee: Mylio, LLC, Bellevue, WA (US)

( * ) Notice: Subject to any disclaimer, the term of this patent is extended or adjusted under 35 U.S.C. 154(b) by 0 days.

(21) Appl. No.: 14/750,809

(22) Filed: Jun. 25, 2015

(51) Int. Cl.
*G06K 9/40* (2006.01)
*G06T 5/00* (2006.01)
*G06K 9/46* (2006.01)
*H04N 19/44* (2014.01)
*G06T 7/00* (2006.01)

(52) U.S. Cl.
CPC ... *G06T 5/00* (2013.01); *G06K 9/46* (2013.01); *G06T 7/0051* (2013.01); *H04N 19/44* (2014.11); *G06K 2009/4666* (2013.01)

(58) Field of Classification Search
None
See application file for complete search history.

(56) References Cited

U.S. PATENT DOCUMENTS

| | | |
|---|---|---|
| 6,757,450 B1 | 6/2004 | Gershony et al. |
| 8,533,258 B2 | 9/2013 | Parker, III et al. |
| 8,750,574 B2 | 6/2014 | Ganong et al. |
| 8,769,049 B2 | 7/2014 | Murphy et al. |
| 2011/0047341 A1 | 2/2011 | Yu et al. |
| 2012/0203932 A1 | 8/2012 | da Costa et al. |
| 2012/0320069 A1 | 12/2012 | Lee et al. |
| 2013/0063462 A1 | 3/2013 | Bloomfield et al. |
| 2013/0190981 A1* | 7/2013 | Dolinar ............ B60R 11/04 701/41 |
| 2014/0161326 A1 | 6/2014 | Ganong et al. |
| 2014/0205207 A1 | 7/2014 | Bhatt |
| 2015/0131898 A1* | 5/2015 | Schelten ............ G06T 5/003 382/159 |

* cited by examiner

*Primary Examiner* — Soo Park
(74) *Attorney, Agent, or Firm* — Seed IP Law Group PLLC

(57) ABSTRACT

Systems and methods for processing an image through an ordered series of image filters (i.e., an image filter chain) to produce an output image. The systems and methods of the present disclosure function to partition or break-up an image into dynamically sized tiles which are processed efficiently (e.g., using minimal memory), quickly and on-demand. The systems and methods allow tile sizes to be calculated dynamically based on what each image filter in an image filter chain needs. By processing each tile on-demand, significant memory and time savings are achieved because only the parts of an image required for display are processed. Further, such functionality allows for decoding of only a portion of the image, which requires less memory and operates much faster than if the entire image was decoded.

30 Claims, 12 Drawing Sheets

US 9,286,657 B1

EFFICIENT IMAGE PROCESSING USING DYNAMICALLY SIZED TILES

BACKGROUND

1. Technical Field

The present disclosure generally relates to processing of digital images.

2. Description of the Related Art

Computer-based digital image processing or editing applications may allow a user to adjust a digital image after the image has been captured or created. For example, an image editing application may be used to change the exposure of the image, to add highlights or shadows to the image, to crop an image, among other adjustments.

Such image editing applications typically present user interface controls for adjusting the image. Examples of such user interface controls include virtual buttons, graphical slider controls and text entry fields, among other controls. The controls may be used to change the values of various adjustable parameters of the digital image.

Many of these image-editing applications also present a preview image. The preview image is a version of the digital image that has been adjusted based on the current settings of the user interface controls. When the user changes the setting of one of the user interface controls, these image-editing applications update the preview image to reflect the settings change. By presenting a preview image which is updated as the user manipulates the user interface controls, the user can experiment with different changes to adjustable parameters and receive visual feedback on how the changes affect the digital image undergoing adjustment. The adjusted image may be output to a display, a printer, a file, etc.

A technique for applying the current settings of the user interface controls to a source image involves the image editing application processing a version of the digital image through an image filter chain in response to detecting user input that changes the value of an adjustable parameter. Generally, a filter chain is an ordered set or series of image filters. Each filter accepts as input a digital image and optionally accepts values for one or more adjustable parameters of that filter. Each filter produces a processed digital image as output. Each filter may process its input digital image differently to accomplish different image adjustments. For example, a first filter may adjust the color of its input image while a second filter may sharpen its input image while a third filter may crop its input image. The image that is output by a filter in the ordered set may be provided as input to the next filter in the ordered set. Thus, with a filter chain, a combination of multiple image adjustments may be applied to the digital image undergoing adjustment to produce an updated preview image.

Unfortunately, using a filter chain to update the preview image may result in a sub-optimal user experience. In particular, there may be a delay noticeable to the user after the user changes the setting of user interface controls for an adjustable parameter and before the preview image is updated to reflect the change or before an output image is sent to a printer or written to a file. This noticeable delay may be caused by the time needed to process the digital image undergoing adjustment through the filter chain. Such delay or other technical problems may be due to the memory requirements of implementing the filter chain, the processing requirements of implementing the filter chain, combinations thereof, or due to other factors, such as hardware limitations of the processor-based devices used to for the image processing tasks.

Further, as the number of adjustable parameters supported by the image editing application increases, the number of filters in the filter chain may also increase, adding to this delay. Further, users may want to edit images utilizing comparatively less powerful processor-based devices, such as tablet computers and smart phones. Because of this noticeable time lag, the user may become frustrated with an image editing application.

BRIEF SUMMARY

A method of operation for an image processor system to process a source image may be summarized as including: receiving, by at least one processor of the image processor system, image data from the source image; receiving, by the at least one processor, an image filter chain specification which specifies an ordered series of one or more image filters between an image filter chain input and an image filter chain output; determining, by the at least one processor, an output image size by forward iterating through each of the one or more image filters in the image filter chain specification from the image filter chain input to the image filter chain output, the output image size being a size of an output image output from the image filter chain specification; determining, by the at least one processor, geometries for a plurality of output tiles based at least in part on the determined output image size; and generating, by the at least one processor, a plurality of input tiles which each correspond to one of the output tiles by reverse iterating each of the output tiles through each of the one or more image filters in the image filter chain specification.

Determining an output image size may include: providing, by the at least one processor, an input image size to at least a subset of the image filters in the image filter chain specification; and receiving, by the at least one processor, an output image size from the at least a subset of the image filters in the image filter chain specification. The image filter chain specification may specify at least a first image filter and a second image filter, and determining an output image size may include: providing, by the at least one processor, an input image size to first image filter in the image filter chain specification; receiving, by the at least one processor, a first output image size from the first image filter in the image filter chain specification; providing, by the at least one processor, the first output image size to the second image filter in the image filter chain specification; and receiving, by the at least one processor, a second output image size from the second image filter in the image filter chain specification. Generating a plurality of input tiles may include: for each output tile, providing, by the at least one processor, position information and dimension information as input to each of the image filters in the image filter chain specification; receiving, from each of the image filters in the image filter chain specification, source rectangle information indicative of position information and dimension information for a source rectangle required to generate an image having the provided position information and dimension information; and receiving, from each of the image filters in the image filter chain specification, region of interest information indicative of a region of interest within the source rectangle. Receiving image data from the source image may include: determining, by the at least one processor, a source image region of interest based at least in part on the input tiles; and receiving, by the at least one processor, image data for the determined source image region of interest.

The method of operation for an image processor system to process a source image may further include decoding, by the at least one processor, the determined source image region of interest of the source image to provide the image data.

The method of operation for an image processor system to process a source image may further include: populating, by the at least one processor, each of the input tiles with the image data from the source image; processing, by the at least one processor, each of the populated input tiles through each of the one or more image filters in the image filter chain specification; and generating, by the at least one processor, the output image by populating each of the output tiles with respective processed image data from each of the corresponding input tiles.

Processing each of the populated input tiles may include: generating, by the at least one processor, an input working tile and an output working tile; storing, by the at least one processor, the input working tile and the output working tile in at least one nontransitory processor-readable medium; designating, by the at least one processor, the input working tile as a first input tile for a first one of the image filters; designating, by the at least one processor, the output working tile as a first output tile for the first one of the image filters; processing the first input tile of the first one of the image filters through the first one of the image filters; designating, by the at least one processor, the output working tile as a second input tile for a second one of the image filters; and designating, by the at least one processor, the input working tile as a second output tile for the second one of the image filters.

The method of operation for an image processor system to process a source image may further include: prior to the generating of the input working tile and the output working tile, determining, by the at least one processor, a maximum width of the input tiles and the output tiles; determining, by the at least one processor, a maximum height of the input tiles and the output tiles; and determining, by the at least one processor, a size for the input working tile and the output working tile based at least in part on the determined maximum width and maximum height, wherein generating the input working tile and the output working tile may include generating the input working tile and the output working tile based at least in part on the determined size for the input working tile and the output working tile.

The method of operation for an image processor system to process a source image may further include storing, by the at least one processor, the image data in a nontransitory processor-readable medium operatively coupled with a graphics processing unit (GPU).

The method of operation for an image processor system to process a source image may further include: storing, by the at least one processor, a scaled version of the source image in a nontransitory processor-readable medium, wherein receiving image data may include receiving the scaled version of the source image from the nontransitory processor-readable medium.

The method of operation for an image processor system to process a source image may further include: determining, by the at least one processor, whether at least one component of the image processor system is capable of reading from each of a plurality of bit depths; and determining, by the at least one processor, whether the at least one component of the image processor system is capable of writing to each of a plurality of bit depths.

Receiving image data from the source image may include receiving image data having a bit depth based at least in part on the determination of whether at least one component of the image processor system is capable of reading from each of a plurality of bit depths.

The method of operation for an image processor system to process a source image may further include: determining, by the at least one processor, which bit depth of the plurality of bit depths is the highest precision bit depth which the at least one component of the image processor system is capable of writing to and read from; and setting the determined bit depth as a bit depth for each of the image filters in the image filter chain specification.

The method of operation for an image processor system to process a source image may further include: determining, by the at least one processor, a bit depth for an output component associated with the image processor system; and setting a bit depth of the output tiles based at least in part on the determined bit depth for the output component.

Determining a bit depth for an output component may include determining a bit depth for at least one of a display, a printer, or a file.

An image processor system to process a source image may be summarized as including: at least one nontransitory processor-readable medium that stores processor-executable instructions; and at least one processor communicably coupled to the at least one nontransitory processor-readable medium, the at least one processor: receives image data from the source image; receives an image filter chain specification which specifies an ordered series of one or more image filters between an image filter chain input and an image filter chain output; determines an output image size by forward iterating through each of the one or more image filters in the image filter chain specification from the image filter chain input to the image filter chain output, the output image size being a size of an output image output from the image filter chain specification; determines geometries for a plurality of output tiles based at least in part on the determined output image size; and generates a plurality of input tiles which each correspond to one of the output tiles by reverse iterating each of the output tiles through each of the one or more image filters in the image filter chain specification.

The at least one processor may: provide an input image size to at least a subset of the image filters in the image filter chain specification; and receive an output image size from the at least a subset of the image filters in the image filter chain specification. The image filter chain specification may specify at least a first image filter and a second image filter, and the at least one processor may: provide an input image size to first image filter in the image filter chain specification; receive a first output image size from the first image filter in the image filter chain specification; provide the first output image size to the second image filter in the image filter chain specification; and receive a second output image size from the second image filter in the image filter chain specification.

The at least one processor may: for each output tile, provide position information and dimension information as input to each of the image filters in the image filter chain specification; receive, from each of the image filters in the image filter chain specification, source rectangle information indicative of position information and dimension information for a source rectangle required to generate an image having the provided position information and dimension information; and receive, from each of the image filters in the image filter chain specification, region of interest information indicative of a region of interest within the source rectangle. The at least one processor may: determine a source image region of interest based at least in part on the input tiles; and receive image data for the determined source image region of interest. The at least one processor may decode the determined source image region of interest of the source image to provide the image data. The at least one processor may: populate each of the input tiles with the image data from the source image; process each of the populated input tiles through each of the one or more image filters in the image filter chain specification; and generate the output image by populating each of the output tiles with respective processed image data from each of the corresponding input tiles. The at least one processor may: generate an input working tile and an output working tile; store the input working tile and the output working tile in at the least one nontransitory processor-readable medium; designate the input working tile as a first input tile for a first one of the image filters; designate the output working tile as a first output tile for the first one of the image filters; process the first input tile of the first one of the image filters through the first one of the image filters; designate the output working tile as a second input tile for a second one of the image filters; and designate the input working tile as a second output tile for the second one of the image filters. Before the at least one processor generates the input working tile and the output working tile, the at least one processor may: determine a maximum width of the input tiles and the output tiles; determine a maximum height of the input tiles and the output tiles; and determine a size for the input working tile and the output working tile based at least in part on the determined maximum width and maximum height, wherein the at least one processor may generate the input working tile and the output working tile based at least in part on the determined size for the input working tile and the output working tile. The at least one processor may include at least one graphics processing unit (GPU), and the at least one nontransitory processor-readable medium may include at least one nontransitory processor-readable medium operatively coupled to the at least one GPU, and wherein the at least one processor may store the image data in the at least one nontransitory processor-readable medium operatively coupled to the at least one GPU. The at least one processor may store a scaled version of the source image in the at least one nontransitory processor-readable medium; and receive the scaled version of the source image from the at least one nontransitory processor-readable medium. The at least one processor may: determine whether at least one component of the image processor system is capable of reading from each of a plurality of bit depths; and determine whether the at least one component of the image processor system is capable of writing to each of a plurality of bit depths. The at least one processor may receive image data having a bit depth based at least in part on the determination of whether at least one component of the image processor system is capable of reading from each of a plurality of bit depths. The at least one processor may: determine which bit depth of the plurality of bit depths is the highest precision bit depth which the at least one component of the image processor system is capable of writing to and read from; and set the determined bit depth as a bit depth for each of the image filters in the image filter chain specification. The at least one processor may: determine a bit depth for an output component associated with the image processor system; and set a bit depth of the output tiles based at least in part on the determined bit depth for the output component. The output component may include at least one of a display, a printer, or a file.

A method of operation for an image processor system to process a source image may be summarized as including: providing, by the at least one processor, an image filter chain specification which specifies an ordered series of one or more image filters; determining, by the at least one processor, a size of an output image output from the image filter chain specification; determining, by the at least one processor, geometries for a plurality of output tiles based at least in part on the determined size of the output image; and generating, by the at least one processor, a plurality of input tiles which each correspond to one of the output tiles by reverse iterating each of the output tiles through each of the one or more image filters in the image filter chain specification.

The method of operation for an image processor system to process a source image may further include: populating, by the at least one processor, each of the input tiles with the image data; processing, by the at least one processor, each of the populated input tiles through each of the one or more image filters in the image filter chain specification; and generating, by the at least one processor, the output image by populating each of the output tiles with respective processed image data from each of the corresponding input tiles.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
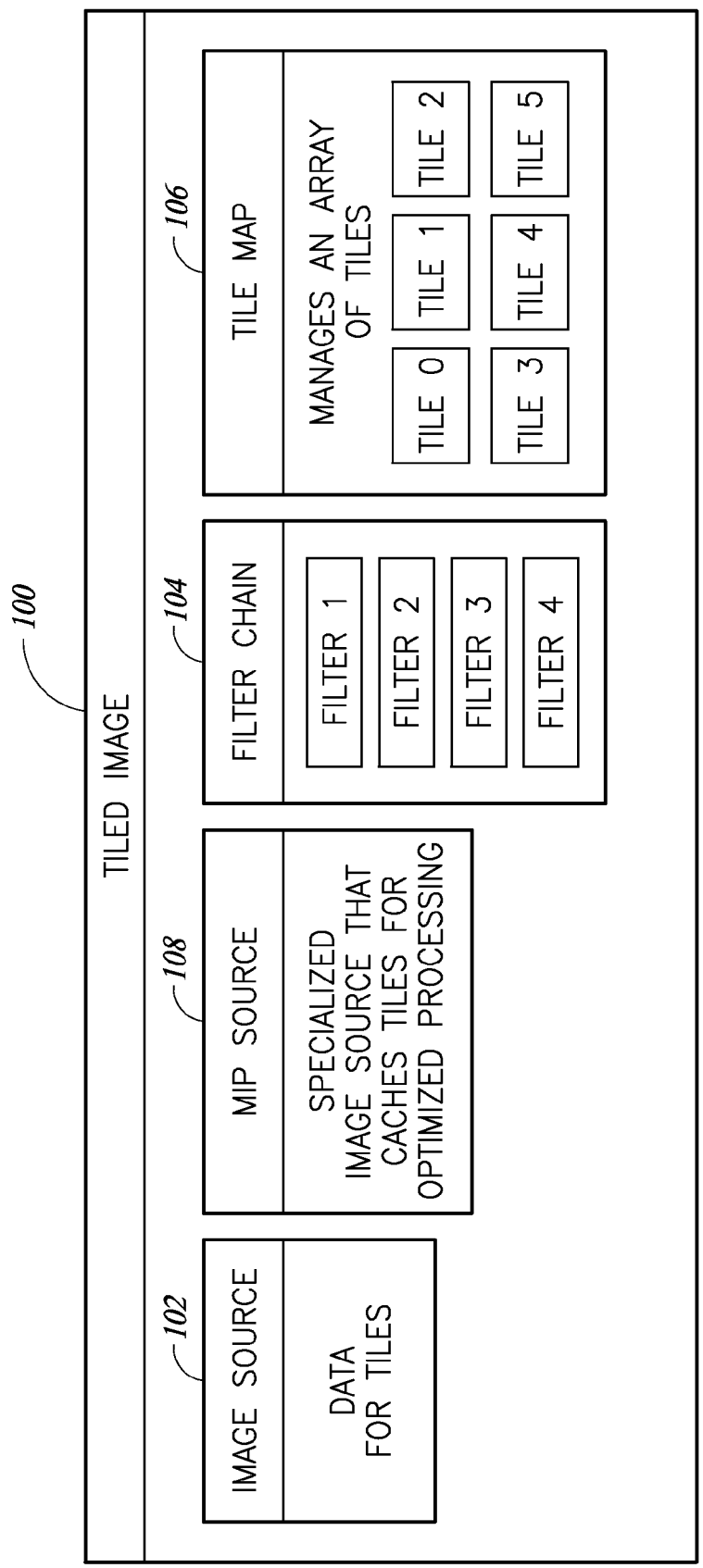
FIG. 1 is a schematic diagram of a state machine which may be implemented in an image processor system to process digital images, according to one illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the implementations.

As used herein, the terms "size" or "dimension" refer to a two-dimensional structure including a width and a height. The terms "position" or "coordinate" refer to a structure that contains an X and Y location. The term "rectangle" (or rect) refers to a structure that contains an X and Y position as well as a width and height. The term "region of interest" (ROI) refers to a rectangle that defines an area of interest, usually within an image or tile. The term "image" refers to a two-dimensional array of pixels contained within a size (i.e. width and height). Pixels can be in a variety of formats including, but not limited to, RGB, ARGB, YUV, Luminance, Color Filter Array (CFA), etc. As used herein, a "tile" refers to a portion of an image defined by a rectangle.

As used herein, the term "Image Source" refers to an abstract object that provides pixel data to generate tiles or images. The pixel data may come from a variety of sources including, but not limited to, bitmap, JPEG, TIFF, PNG, RAW, DNG, GPU Textures, etc. The term "Tile Map" refers to an array of tiles that can be combined to form an image.

An "image filter" or "filter" is an object that defines a number of operations for transforming pixel data. An example of such operations includes an operation that applies a transformation to a set of input pixels which produces a set of output pixels. The filter may optionally be provided with the X & Y positions of the input and output pixels. A filter may include an optional set of settings that manipulate how pixel data is transformed by the filter. Another example includes an operation where given an input image size produces an output image size. For example, a crop filter produces an output image size that is smaller than the input image size. Another example includes an operation which, given a destination rectangle, produces the corresponding source rectangle required to produce the destination rectangle. Another example includes an optional operation where given a destination rectangle produces the corresponding Source ROI within the source rectangle that will contain valid data after the filter has been applied (this is used in some implementations for optimizations).

As used herein, a "filter chain" refers to an ordered set of image filters. A "tile chain" refers an ordered set of rectangles that define a mapping for a tile that is processed through a filter chain. Rect sizes are dynamic and are defined by their corresponding image filters. Optionally, the tile chain may also include an ordered set of ROIs that mirror the ordered set of Rects and that define the area of valid pixel data within each of their corresponding Rects.

Implementations of the present disclosure address some or all of the aforementioned technical problems by providing systems and methods for processing an image through a filter chain to produce an output image. Generally, the systems and methods disclosed herein function to partition or break-up an image into dynamically sized tiles which can be processed efficiently (e.g., using minimal memory), quickly, and on-demand. One or more implementations discussed below allow tile sizes to be calculated dynamically based on what each image filter in an image filter chain needs. This functionality is more efficient than previous systems which use fixed tile sizes or intermediate images.

As discussed further below, since some implementations process each tile on-demand, significant memory and time savings are achieved because only the parts of an image required for display are processed. For example, when an image is cropped, only the part of the image needed for the crop function needs to be loaded into memory. This functionality allows for decoding of only a portion of the image ("partial image decode"), which requires less memory and operates much faster than if the entire image was decoded. Thus, the implementations discussed herein provide significantly improved image processor systems compared to those which are currently available.

FIG. 1 illustrates a state machine 100, referred to herein as a Tiled Image state machine or simply "Tiled Image," which manages the process of processing an input image, represented as an Image Source 102, through an image filter chain 104 (Filter Chain) which comprises a series of filters. The Image Source 102 may represent any kind of image data, such as JPEG, TIFF, PNG, RAW, DNG, etc. In the illustrated implementation, the filter chain 104 comprises four filters, namely, Filter 1, Filter 2, Filter 3, and Filter 4. Of course, some implementations may utilize a greater or lesser number of filters (e.g., 1 filter, 3 filters, 10 filters). Image data from the Image Source 102 is run through the filter chain 104 to produce an output tile map (Tile Map 106), which manages an array of final output tiles (e.g., tiles 0-5) to produce an output image.

As discussed further below, in some implementations tiles are run or processed on-demand such that only tiles which need to be displayed are processed. Further, when a tile is processed, the processing begins at the last filter (e.g., Filter 4) in the filter chain 104 and works backwards to the first filter (e.g., Filter 1) to build a region of interest (ROI) mapping which determines the maximum tile size needed, as well as optional source and destination ROIs required by each filter in the filter chain.

In some implementations, the Tiled Image state machine 100 may also include a "Mip Source" 108, which is a specialized Image Source 102 which caches tiles for optimized processing, as discussed further below.

Figure 2:
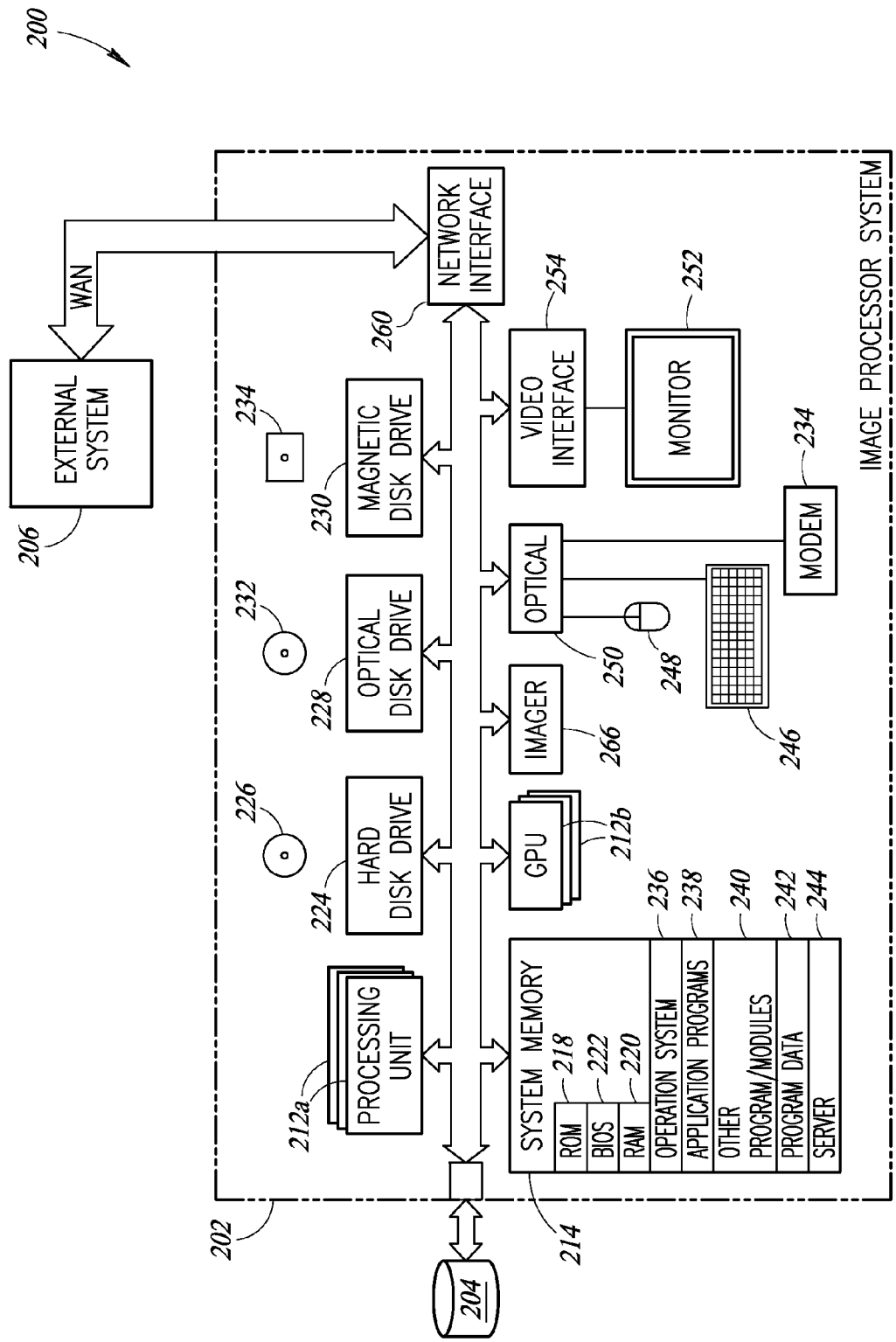
FIG. 2 is a functional block diagram of an image processor system, according to one illustrated implementation.

FIG. 2 shows an environment 200 comprising one or more image processor systems 202 (only one illustrated) and one or more associated nontransitory computer- or processor-readable storage media (e.g., volatile and/or nonvolatile memory), such as nontransitory processor-readable medium 204. The image processor system 200 may be a desktop computer, a laptop computer, a tablet computer, a smartphone, a personal digital assistant, a server, etc. The associated nontransitory computer- or processor-readable storage medium 204 is communicatively coupled to the image processor system(s) 202 via one or more communications channels, for example, one or more parallel cables, serial cables, or wireless channels capable of high speed communications, for instance, via FireWire®, Universal Serial Bus® (USB) 2 or 3, and/or Thunderbolt®, Gigabyte Ethernet®.

The environment 200 may also include one or more external processor-based systems or devices 206 (only one illustrated) communicatively coupled to the image processor system(s) 202 by one or more communications channels, for example, one or more wide area networks (WANs) 210, for instance the Internet or Worldwide Web portion thereof.

The networked environment 200 may employ other computer systems and network equipment, for example, additional servers, proxy servers, firewalls, routers and/or bridges. The image processor system 202 will at times be referred to in the singular herein, but this is not intended to limit the implementations to a single device since in typical implementations there may be more than one image processor system 202 involved. Unless described otherwise, the construction and operation of the various blocks shown in FIG. 2 are of conventional design. As a result, such blocks need not be described in further detail herein, as they will be understood by those skilled in the relevant art.

The image processor systems 202 may include one or more processing units 212a, 212b (collectively 212), a system memory 214 and a system bus 216 that couples various system components, including the system memory 214 to the processing units 212. The processing units 212 may be any logic processing unit, such as one or more central processing units (CPUs) 212a, graphics processing units (GPUs) 212b, digital signal processors (DSPs), application-specific integrated circuits (ASICs), field programmable gate arrays (FPGAs), etc. The system bus 216 can employ any known bus structures or architectures, including a memory bus with memory controller, a peripheral bus, and/or a local bus. The system memory 214 includes read-only memory ("ROM") 218 and random access memory ("RAM") 220. In some implementations, the GPUs 212b may include separate GPU memory coupled to the GPUs via a graphics bus, for example. A basic input/output system ("BIOS") 222, which can form part of the ROM 218, contains basic routines that help transfer information between elements within the image processor system(s) 202, such as during start-up.

The image processor systems 202 may include a hard disk drive 224 for reading from and writing to a hard disk 226, an optical disk drive 228 for reading from and writing to removable optical disks 232, and/or a magnetic disk drive 230 for reading from and writing to magnetic disks 234. The optical disk 232 can be a CD-ROM, while the magnetic disk 234 can be a magnetic floppy disk or diskette, for example. The hard disk drive 224, optical disk drive 228 and magnetic disk drive 230 may communicate with the processing units 212 via the system bus 216. The hard disk drive 224, optical disk drive 228 and magnetic disk drive 230 may include interfaces or controllers (not shown) coupled between such drives and the system bus 216, as is known by those skilled in the relevant art. The drives 224, 228 and 230, and their associated non-transitory computer-readable media 226, 232, 234, provide nonvolatile storage of computer-readable instructions, data structures, program modules and other data for the image processor system 202. Although the depicted image processor system 202 is illustrated employing a hard disk drive 224, optical disk drive 228 and magnetic disk drive 230, those skilled in the relevant art will appreciate that other types of computer-readable media that can store data accessible by a computer may be employed, such as WORM drives, RAID drives, magnetic cassettes, flash memory cards, digital video disks ("DVD"), Bernoulli cartridges, RAMs, ROMs, smart cards, etc.

Program modules can be stored in the system memory 214, such as the Tiled Image state machine 100 of FIG. 1, an operating system 236, one or more application programs 238, other programs or modules 240 and program data 242. The system memory 214 may also include communications programs, for example, a server 244 that causes the image processor system 202 to serve electronic information or files via the Internet, intranets, extranets, telecommunications networks, or other networks as described below. The server 244 in the depicted implementation is markup language based, such as Hypertext Markup Language (HTML), Extensible Markup Language (XML) or Wireless Markup Language (WML), and operates with markup languages that use syntactically delimited characters added to the data of a document to represent the structure of the document. A number of suitable servers may be commercially available such as those from Mozilla, Google, Microsoft and Apple Computer.

While shown in FIG. 2 as being stored in the system memory 214, the operating system 236, application programs 238, other programs/modules 240, program data 242 and server 244 can be stored on the hard disk 226 of the hard disk drive 224, the optical disk 232 of the optical disk drive 228 and/or the magnetic disk 234 of the magnetic disk drive 230.

An operator can enter commands and information into the image processor system(s) 202 through input devices such as a touch screen or keyboard 246 and/or a pointing device such as a mouse 248, and/or via a graphical user interface. Other input devices can include a microphone, joystick, game pad, tablet, scanner, etc. These and other input devices are connected to one or more of the processing units 212 through an interface 250 such as a serial port interface that couples to the system bus 216, although other interfaces such as a parallel port, a game port or a wireless interface or a universal serial bus ("USB") can be used. A monitor 252 or other display device is coupled to the system bus 216 via a video interface 254, such as a video adapter. The image processor system(s) 202 can include other output devices, such as speakers, printers, etc.

The image processor systems 202 can operate in a networked environment 200 using logical connections to one or more remote computers and/or devices. For example, the image processor systems 202 can operate in a networked environment 200 using logical connections to one or more processor-based systems 206. Communications may be via a wired and/or wireless network architecture, for instance, wired and wireless enterprise-wide computer networks, intranets, extranets, and/or the Internet. Other implementations may include other types of communications networks including telecommunications networks, cellular networks, paging networks, and other mobile networks. There may be any variety of computers, switching devices, routers, bridges, firewalls and other devices in the communications paths between the image processor systems 202 and the processor-based systems 206.

Figure 3:
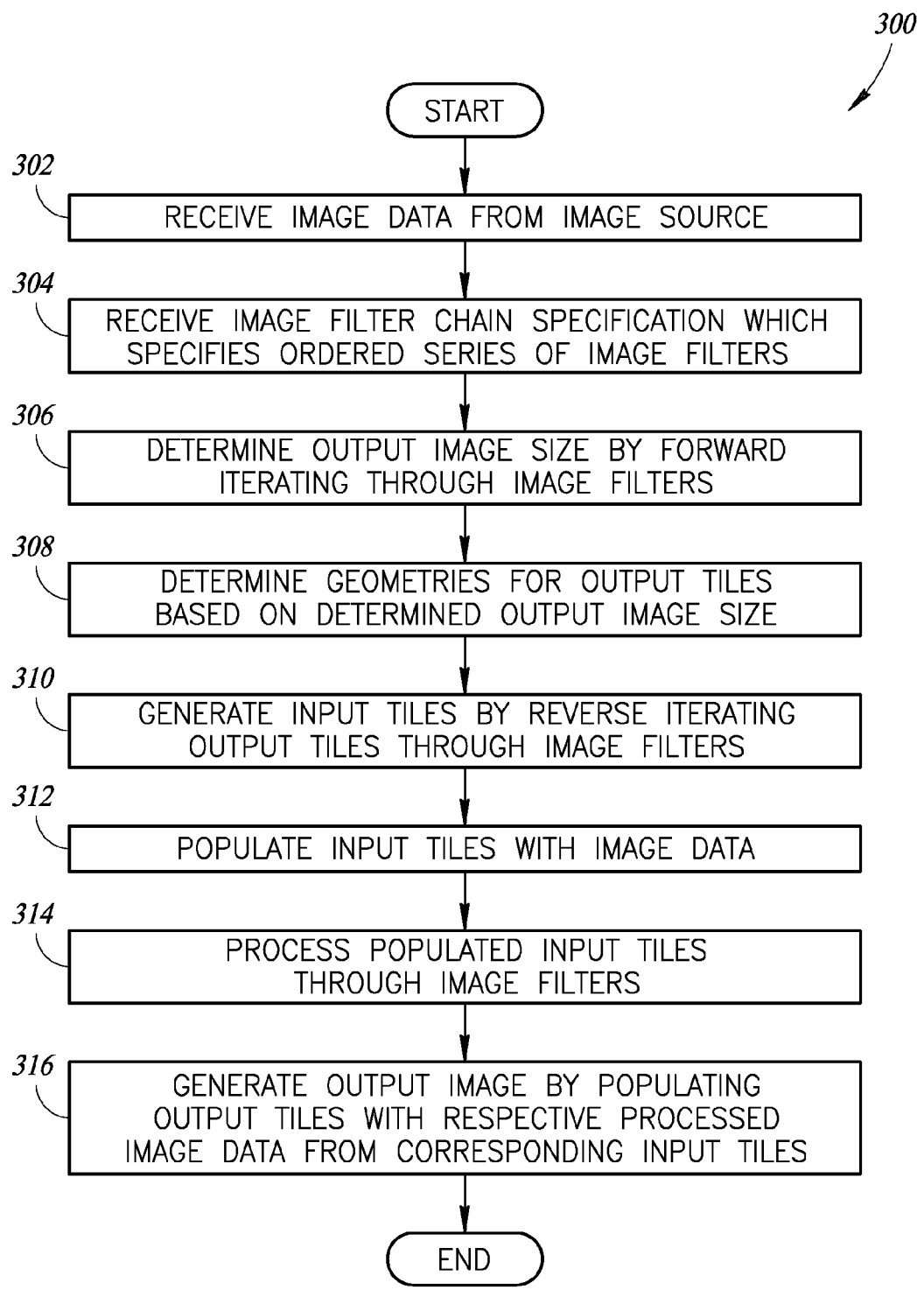
FIG. 3 is a flow diagram of a method of operation of an image processor system to process digital images, according to one illustrated implementation.

FIG. 3 shows a method 300 of operation of an image processor system, such as the image processor system 202 of FIG. 2, to process a digital image. At 302, at least one processor of the image processor system may receive image data from the source image, such as through an Image Source object. As discussed further below, the image data may be for an entire source image or for only a region of interest of a source image. Further, the image data may be a scaled version (e.g., "mipmap" scaled) of the source image.

At 304, the at least one processor may receive an image filter chain specification which specifies an ordered series of one or more image filters. For example, a user may select one or more image filters through a graphical user interface of the image processor system.

At 306, the at least one processor may calculate or otherwise determine an output image size by forward iterating through each of the one or more image filters in the image filter chain specification. The output image size is a size of an output image which is output from the image filter chain specification.

Figure 4:
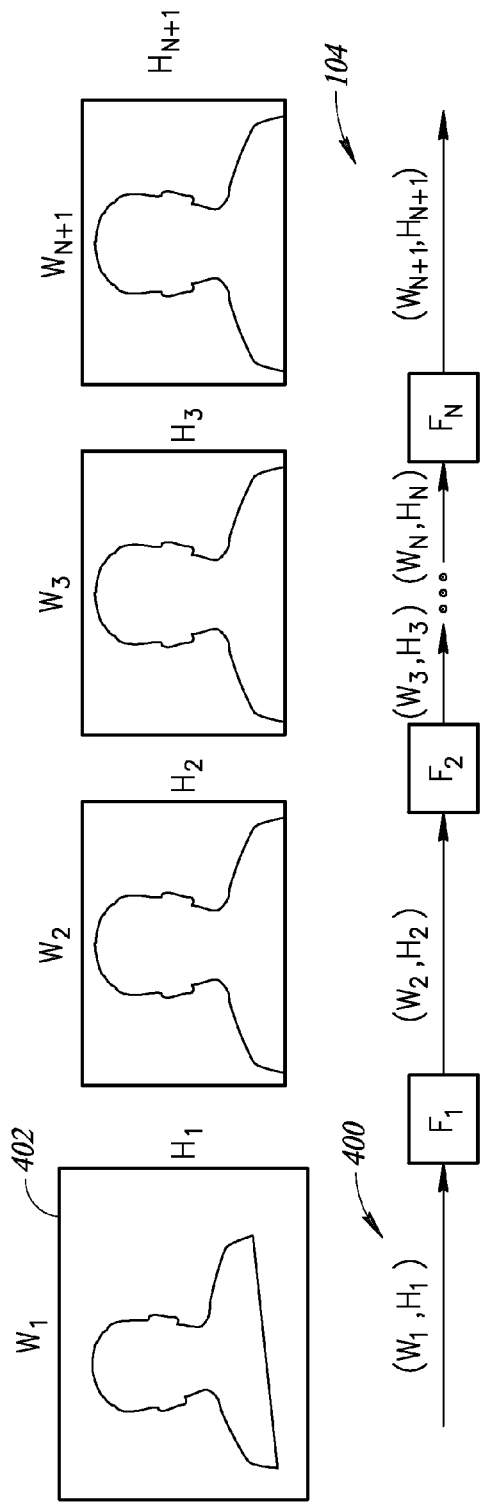
FIG. 4 is a schematic diagram of a filter chain of the state machine of FIG. 1 which may be implemented in an image processor system, according to one illustrated implementation.

As shown in FIG. 4, each of N filters $F_1$-$F_N$ in a filter chain 104 is passed an input image size 400 consisting of a width (W) and a height (H). For example, the first filter $F_1$ is passed an input image size 400 consisting of a width $W_1$ and a height $H_1$ which corresponds to the region of interest of a source image 402 to be processed. Each of the filters returns a new size for the image which is the result of running the filter which consists of a width (W) and a height (H). In general, each filter $F_X$ returns a new size for the image which is the result of running the filter $F_X$ which consists of a width ($W_{X+1}$) and a height ($H_{X+1}$), where X is a number between 1 and N. This allows each of the filters $F_N$ to change the size of the image by making the image smaller or larger, or to leave the image unmodified. For example, a filter which crops an input image will result in a smaller output image, and a filter which adds a border to an input image will result in a larger output image.

Figure 5:
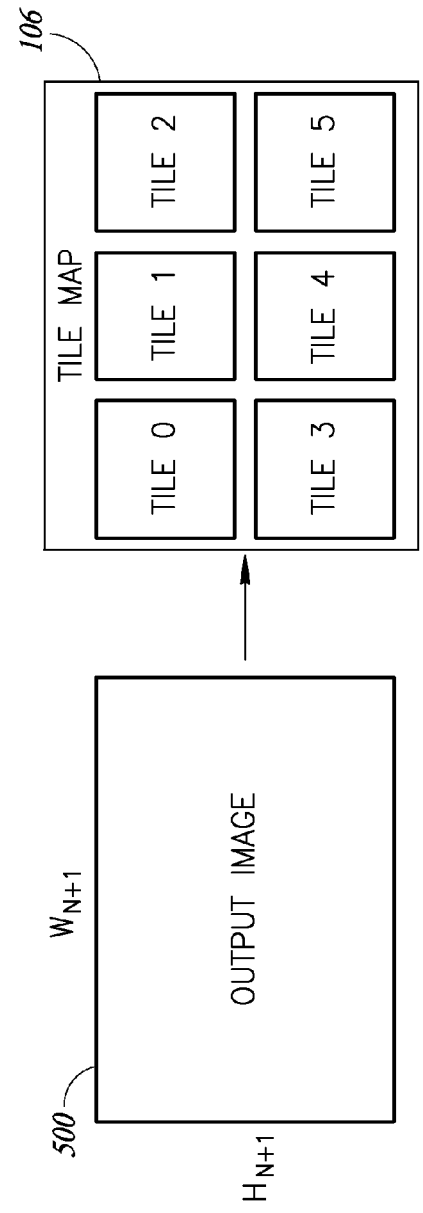
FIG. 5 is a schematic diagram of an output image and a plurality of output tiles, according to one illustrated implementation.

At 308, the at least one processor may determine geometries for a plurality of output tiles based at least in part on the determined output image size. For example, as shown in FIG. 5, once the output image size (e.g., $W_{N+1}$, $H_{N+1}$) has been calculated, an output image 500 is divided into a plurality of output tiles 0-5 which are stored in the Tile Map 106. These output tiles 0-5 constitute the final sizes and positions of the output image 500 which is output by the filter chain 104 (see FIGS. 1 and 4).

At 310, the at least one processor generates a plurality of dynamically sized input tiles which each correspond to one of the output tiles by reverse iterating each of the output tiles (e.g., tiles 0-5 of FIG. 5) through each of the one or more image filters in the image filter chain. Example implementations for generating the plurality of input tiles are discussed below with reference to FIGS. 6-8.

At 312, the at least one processor populates each of the generated input tiles with the image data from the Image Source. Example implementations for populating each of the generated input tiles with the image data are discussed below with reference to FIGS. 9 and 10.

At 314, the at least one processor processes each of the populated input tiles through each of the one or more image filters in the image filter chain. Example implementations for processing each of the populated input tiles through each of the one or more image filters in the image filter chain are discussed below with reference to FIGS. 11A and 11B.

At 316, the at least one processor generates the output image by populating each of the output tiles with respective processed image data from each of the corresponding input tiles. The output image may be output to an output component, such as a display, a printer, or a file associated with the image processor system.

Figure 6:
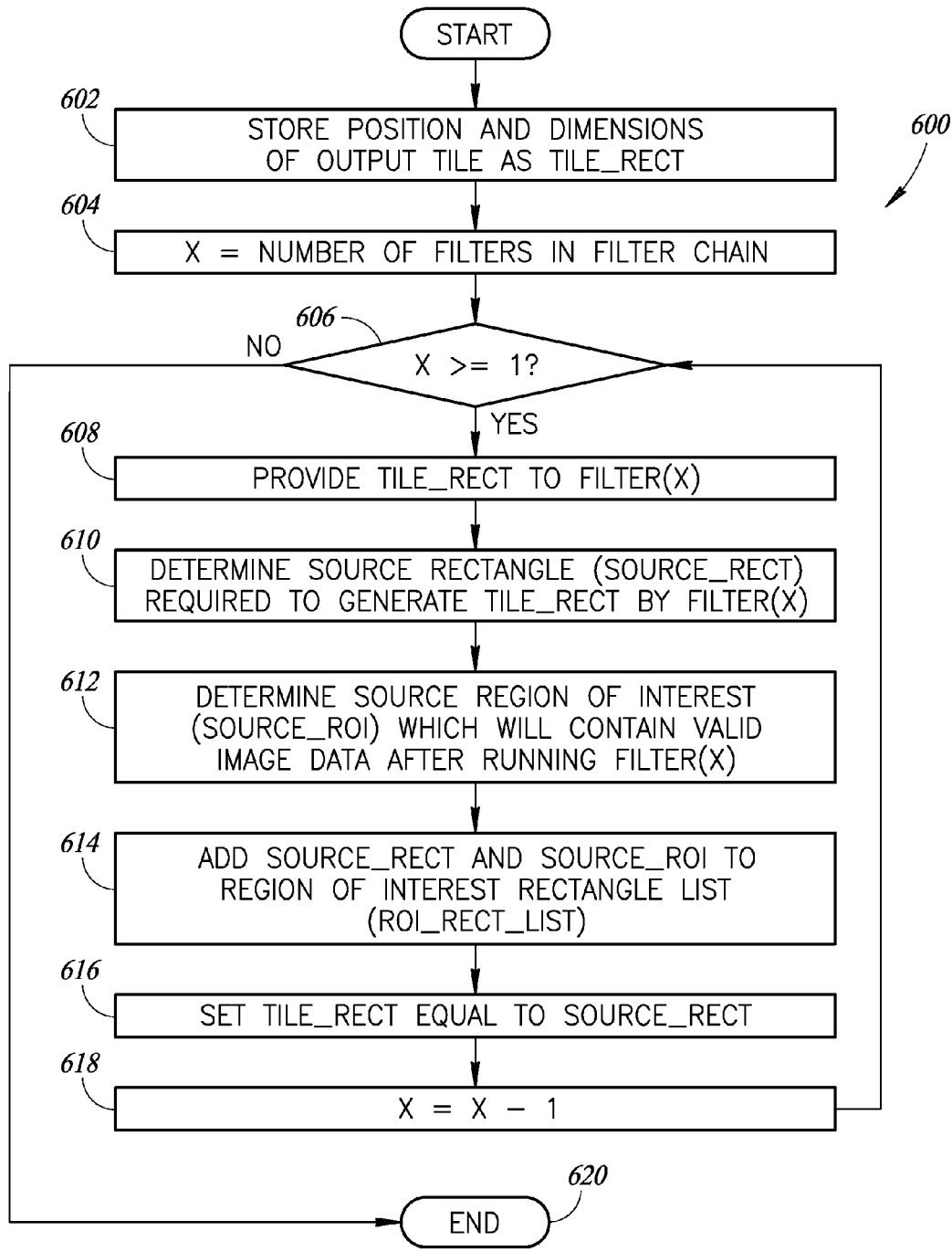
FIG. 6 is a flow diagram of a method of operation of an image processor system to dynamically size tiles used in a filter chain, according to one illustrated implementation.

FIG. 6 shows a method 600 of operation for an image processor system, such as the image processor system 202 of FIG. 2, to dynamically size tiles used to process image data through a filter chain. To generate the final output tiles (e.g., tiles 0-5 of FIG. 5), the geometry of each output tile is reverse mapped through the filter chain. The method 600 may be repeated for each output tile in the Tile Map (FIG. 5).

At 602, the at least one processor stores position information (e.g., x-y position) and dimensions information (e.g., width, height) of the rectangle (rect) of the output tile as TILE_RECT. The width and height of the tiles discussed herein may be different from each other or may the same as each other, wherein in the latter case the tile would be the shape of a square.

Next, the at least one processor reverse iterates through each of the filters in the filter chain, from the last filter to the first filter. For example, at 604 the at least one processor may set a count variable X equal to the number of filters in the filter chain. At 606, the at least one processor may determine whether all of the filters have been iterated through, and if so, may end the method 600 at 620. Otherwise, the at least one processor performs acts 608-616 for each of the filters in the filter chain, starting with the last filter and ending with the first filter.

At 608, the at least one processor passes TILE_RECT as an input to filter (X). At 610, the filter (X) determines a source rectangle (SOURCE_RECT) required to generate TILE_RECT by the filter (X). At 612, the filter (X) optionally determines a source region of interest (SOURCE_ROI) within the source rectangle (SOURCE_RECT) which will contain valid image data after running the filter (X). When determined, the source ROI (SOURCE_ROI) is the same size (width, height) as TILE_RECT, but the x-y position of the source ROI is variable and may be different from the x-y position of TILE_RECT.

At 614, the at least one processor adds the source rectangle (SOURCE_RECT) for the filter (X) and optionally the source ROI (SOURCE_ROI) to a region of interest rectangle list (ROI_RECT_LIST), which is stored in a nontransitory processor-readable medium of the image processor system.

At 616, the at least one processor may set the tile rectangle TILE_RECT for the next filter to be iterated through (i.e., the previous filter in the filter chain) equal to the determined SOURCE_RECT. At 618, the count variable X may be decremented by 1 so that the acts 608-616 are repeated until the process reverse iterates through the first filter in the filter chain.

Figure 7:
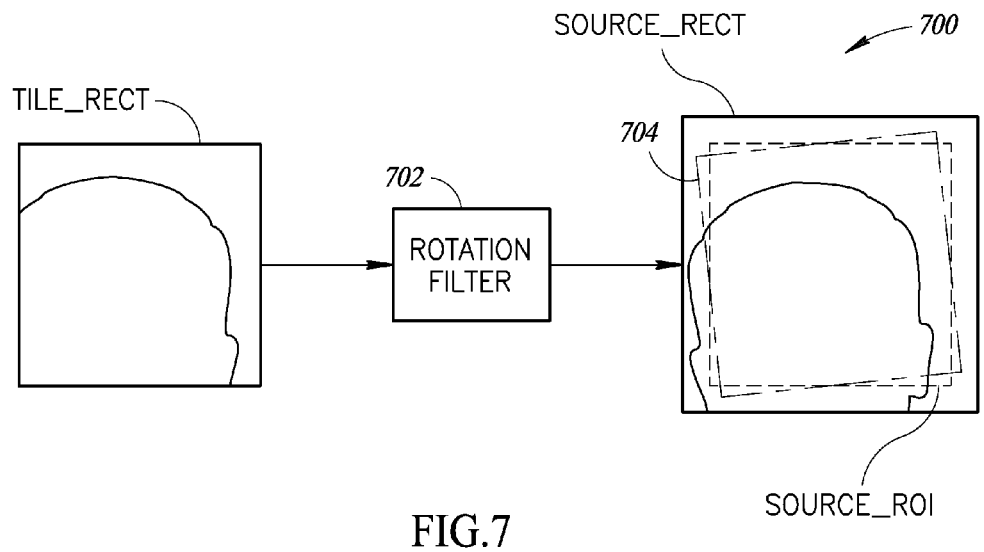
FIG. 7 is a schematic diagram of a tile and an output of an image filter which rotates an image in the tile, according to one illustrated implementation.

FIG. 7 is a schematic diagram 700 of a tile rectangle (TILE_RECT) which is input into an image rotation filter 702 which operates to rotate an input image passed to the rotation filter. The image rotation filter 702 returns a source rectangle (SOURCE_RECT) and, in the illustrated implementation, a source ROI (SOURCE_ROI). As noted above, in some implementations the source ROI calculation may be omitted. An inner outline 704 represents the area from the source image which ends up in the source ROI (SOURCE_ROI) after the image rotation filter has rotated the source image.

Once the output tile mapping is complete, each tile will have a list of source rectangles and optionally a list of source ROIs for each filter in the filter chain. Such is referred to as a "tile chain," which is stored in the ROI rectangle list (ROI_RECT_LIST). This provides a complete mapping for each output tile which maps a rectangle in the source image to the output tile's final rectangle in the output image.

The sizes of the tiles are dynamic since their sizes depend on what filters are contained in the filter chain. Some filters require large source tiles to generate their output tile, while other filters only require source tiles having the same size as their corresponding input tiles. This functionality allows each tile chain to be processed or run independently with no dependencies on other tile chains, which allows for efficient parallel processing techniques.

Figure 8:
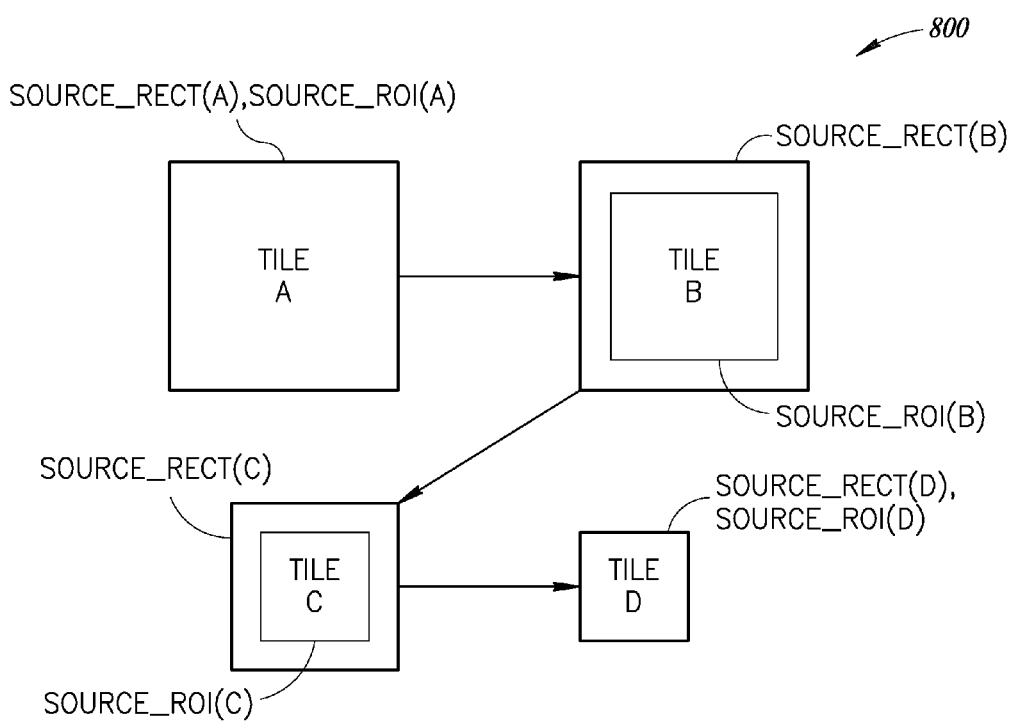
FIG. 8 is a schematic diagram of a mapping of a tile chain from an input tile to an output tile, according to one illustrated implementation.

FIG. 8 is a schematic diagram 800 which shows a tile chain mapping that maps a tile from a source image (tile A), to a first intermediate image (tile B), to a second intermediate image (tile C), and finally to an output image (tile D). The source rectangles (SOURCE_RECT(x)) and the optional source ROIs (SOURCE_ROI(x)) for each of the tiles A-D are indicated in FIG. 8. It is noted that in the mapping from tile A to tile B, the source ROI for tile A, SOURCE_ROI(A), is the same as the source rectangle for tile A (SOURCE_RECT(A)). This means that the corresponding filter does not require extra input pixels to generate a corresponding output tile. In the mapping from tile B to tile C, it is noted that the source rectangle for tile C, SOURCE_RECT(C), is the same size as the source ROI for tile B, SOURCE_ROI(B).

Prior to processing the tiles through the filter chain, the Image Source 102 (FIG. 1) is run. As noted above, the Image Source 102 is an abstraction which only needs to provide image data for tiles. The Image Source 102 may represent any kind of image data, such as JPEG, TIFF, PNG, RAW, DNG, etc. As the Image Source 102 is not run until after the tile geometries are calculated, in some implementations only the part of the source image which is needed for display (or other output) is decoded. For example, if an image is cropped, only the part of the image within the crop rectangle needs to be decoded.

Figure 9:
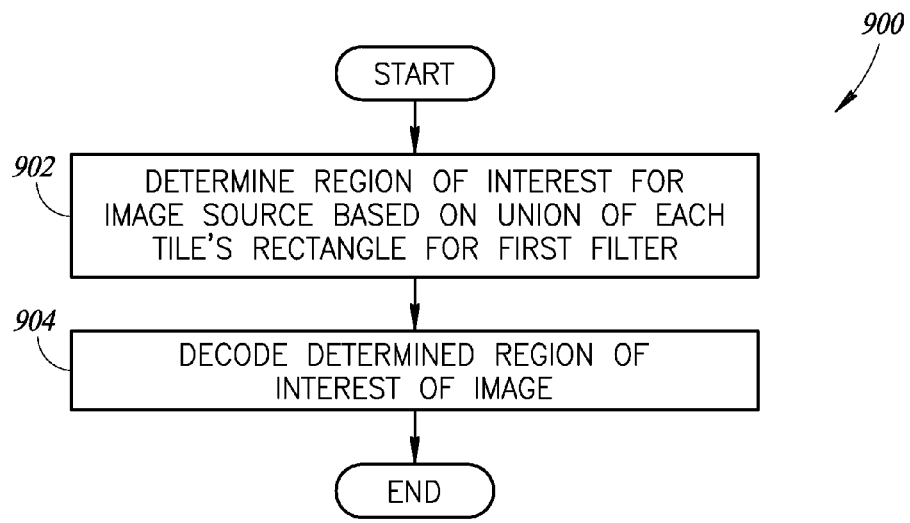
FIG. 9 is a flow diagram of a method of operation of an image processor system to provide image data for a region of interest of an image, according to one illustrated implementation.

FIG. 9 is a flow diagram of a method 900 of operation of an image processor system, such as the image processor system 202 of FIG. 2, to decode only a part of a source image needed by the filters of a filter chain. At 902, the at least one processor of the image processor system may determine a region of interest for the Image Source based on a union of each input tile's rectangle for the first image filter. Such may be expressed as, for all tiles in the Tile Map 106 (FIG. 1), Image Source ROI=union(roi_Rect_
    List[1]·SOURCE_RECT, roi_Rect_
    List[2]·SOURCE_RECT, . . . roi_Rect_
    List[$n$]·SOURCE_RECT)

where "n" is the number of tiles.

At 904, once the Image Source ROI has been calculated, the Image Source is run to decode only the part of the image contained within the ROI.

Figure 10:
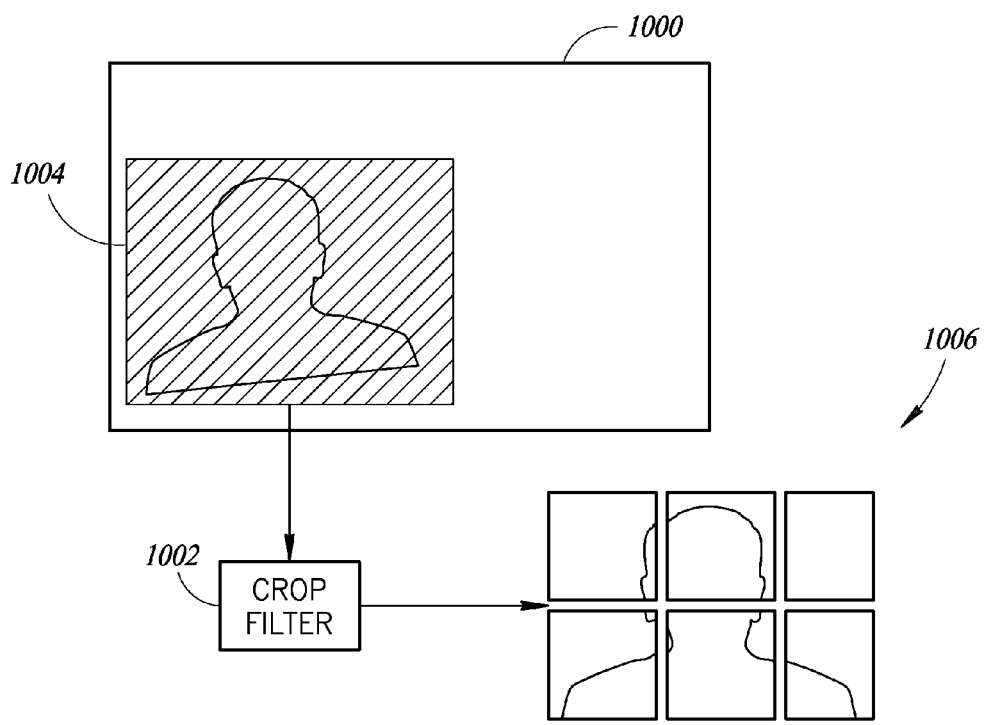
FIG. 10 is a schematic diagram of a source image which is processed through a crop filter, according to one illustrated implementation.

FIG. 10 shows an image 1000 which is to be processed using an image crop filter 1002. A crop region 1004 corresponds to the ROI in the Image Source 102 (FIG. 1) required to be passed to the crop filter 1002 to produce final output tiles 1006 which form an output image. When the Image Source 102 is run, the Image Source only needs to decode the part of the image which contains the ROI (e.g., the crop region 1004). This functionality allows for significant savings in both memory and time.

Figure 11A:
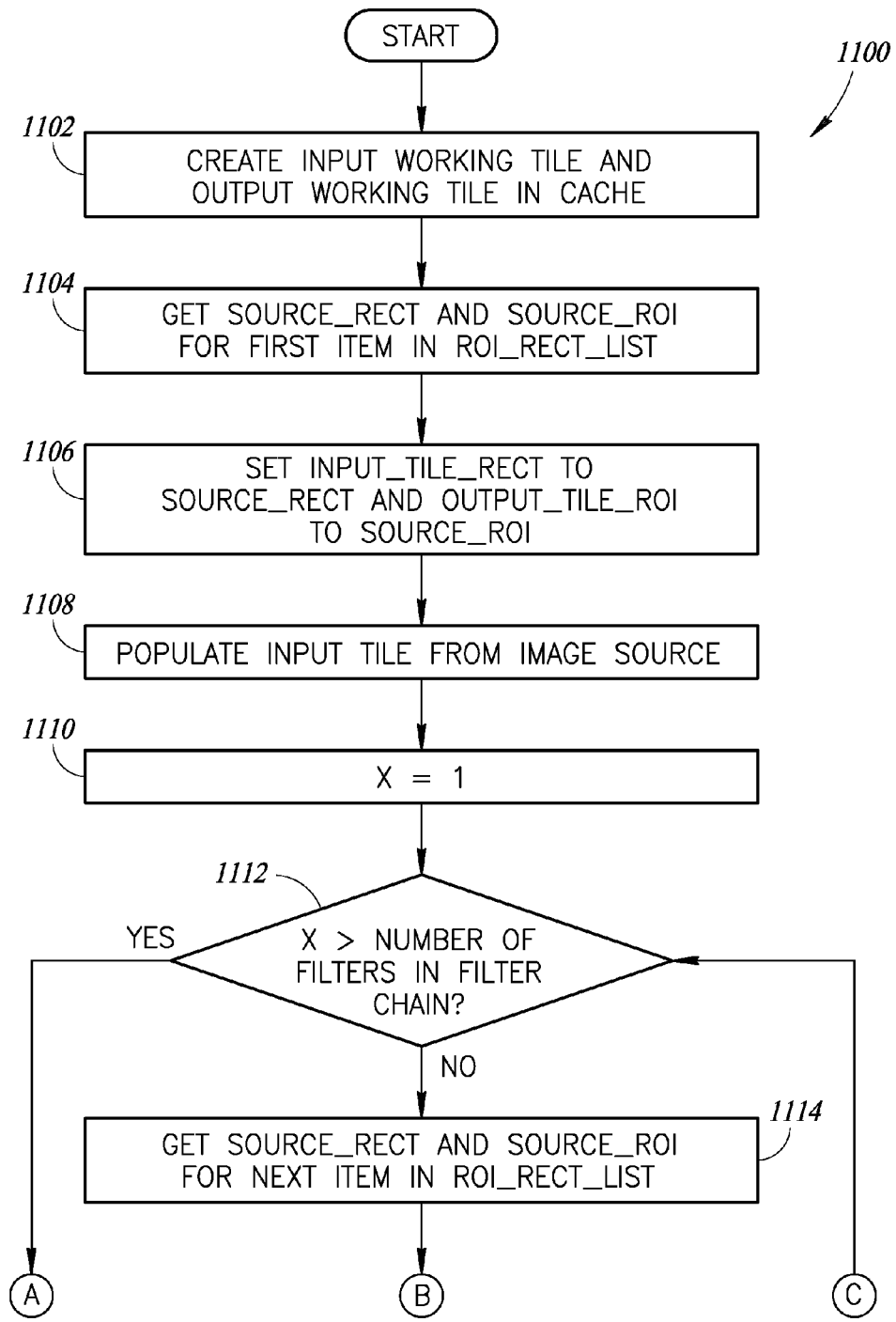
FIGS. 11A-11B are a flow diagram of a method of operation of an image processor system to implement a filter chain in an optimized manner, according to one illustrated implementation.
Figure 11B:
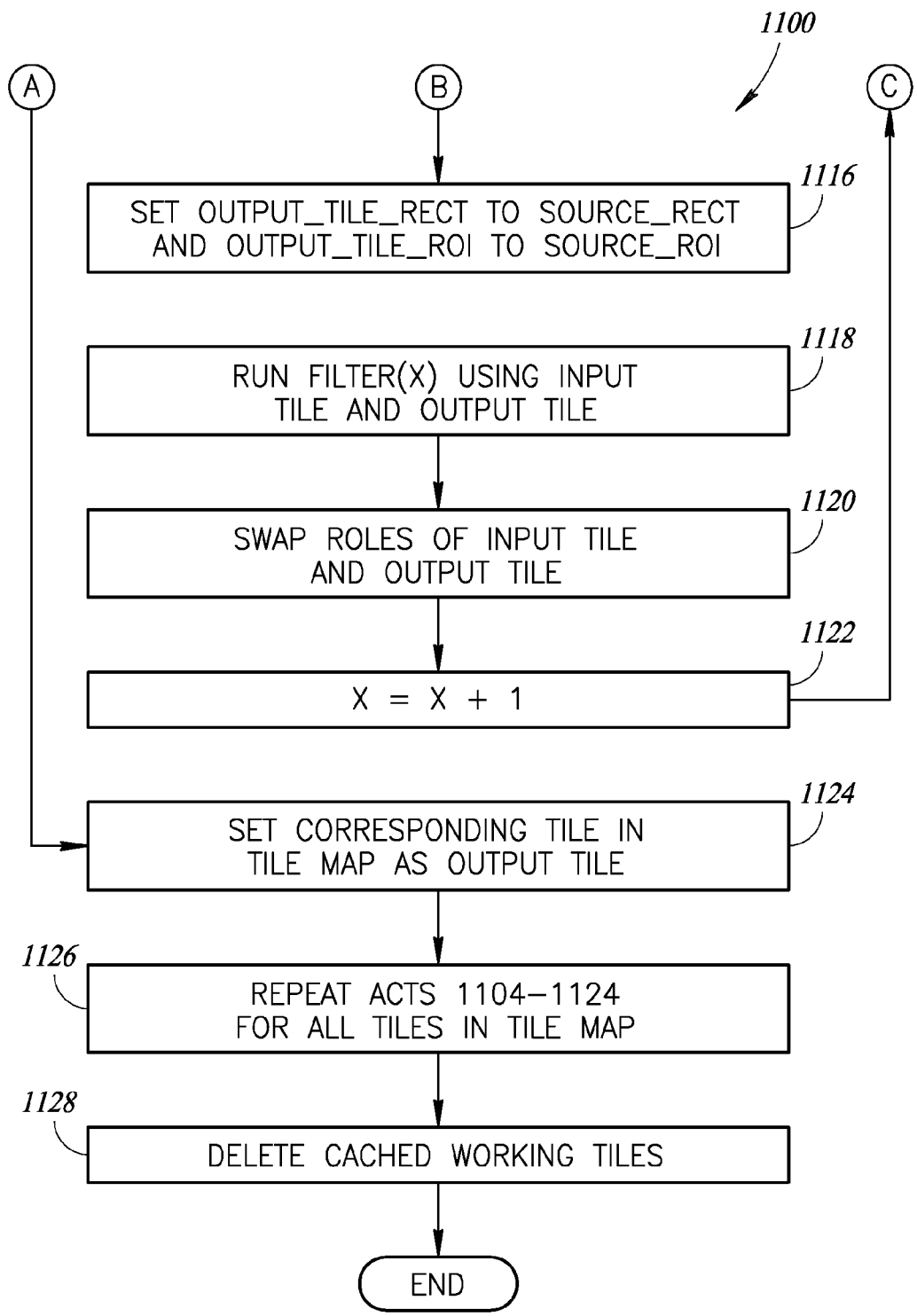

FIGS. 11A and 11B show a method 1100 of operation of an image processor system, such as the image processor system 202 of FIG. 2, to process input tiles through a filter chain to produce output tiles which form an output image.

At 1102, the at least one processor may create an input working tile and an output working tile, which are cached in memory for reuse during the method 1100. The dimensions for the input working tile and the output working tile may be determined by calculating the maximum tile width and maximum tile height for all of the rectangles in the ROI_RECT_LIST for all tiles to provide the maximum tile size required to render any tile.

At 1104, the at least one processor may obtain the source rectangle (SOURCE_RECT) and optionally the source ROI (SOURCE_ROI) for the first item in the ROI rectangle list (i.e., ROI_RECT_LIST[0]). At 1106, the at least one processor may set the input tile's rectangle, INPUT_TILE_RECT, equal to the source rectangle, SOURCE_RECT, and may optionally set the input tile's ROI, INPUT_TILE_ROI, equal to the source ROI, SOURCE_ROI. At 1108, the at least one processor populates the input tile from the Image Source.

Once the input tile is populated, the at least one processor performs acts 1114, 1116, 1118, and 1120 (discussed below) for each filter in the filter chain, starting with the first filter and forward iterating through the filter chain through iteration of the last filter. Acts 1110, 1112 and 1122 provide the logic for forward iterating through each of the filters in the filter chain.

At 1114, the at least one processor obtains the source rectangle and optionally the source ROI for the next item in the ROI rectangle list (i.e., ROI_RECT_LIST[next]). At 1116, the at least one processor sets the output tile's rectangle to SOURCE_RECT and optionally sets the output tile's ROI to SOURCE_ROI. The output tile's rectangle should be the same size as the input tile's ROI. That is, the input tile's ROI indicates the valid data after running the image filter. The size of this valid data matches the size of the output tile's rectangle.

At 1118, the at least one processor runs the image filter using the input tile as an input source and outputs to the output working tile. Thus, upon completion, the output tile's rectangle contains valid image data.

At 1120, the at least one processor swaps the roles of the input working tile and the output working tile. The output working tile is marked as the new input working tile and the input working tile is marked as the new output working tile. Acts 1114, 1116, 1118, 1120 are repeated until all filters in the filter chain have been run.

At 1124, after the last filter has been run, the output working tile is set to the corresponding output tile in the Tile Map (FIG. 1).

At 1126, the at least one processor repeats acts 1104-1124 for each tile in the Tile Map. At 1128, the at least one processor deletes the cached input working tile and output working tile.

It is noted that the input and output working tiles are cached as an optimization. As can be appreciated, repeatedly allocating and deleting tiles can be very slow, especially for GPUs. In the implementation discussed above, only two working tiles are created and cached for the entire image, so as to eliminate extra allocations and deletions. However, an alternate method of creating and deleting the tiles as needed is also within the scope of the present disclosure.

In some implementations, the output tiles in the Tile Map may be populated directly from the Image Source in instances where there are no filters to run in the filter chain. Such functionality allows for avoiding the creation of the working tiles altogether when there are no filters to run.

In the implementations discussed above, whenever a filter is run, the input tile's ROI (SOURCE_ROI) and the output tile's rect (SOURCE_RECT) are the same size (width and height). This is done to work efficiently with current GPU texture implementations. With current GPU APIs, the best way to render from one texture (input tile) to another (output tile) is to ensure that both are mapped to the same size. The input texture's ROI is mapped as the input texture coordinates and the output texture's rectangle is mapped as the vertex coordinates. The source ROI is tracked to know what data is valid in the output tile. However, such is not a requirement of the present disclosure. In particular, with a CPU implementation, it may be more efficient to render from an input tile into an output tile which is already sized with the width and height dimensions of the source ROI. In that case, the input tile and the output tile would have different dimensions from each other.

Figure 12:
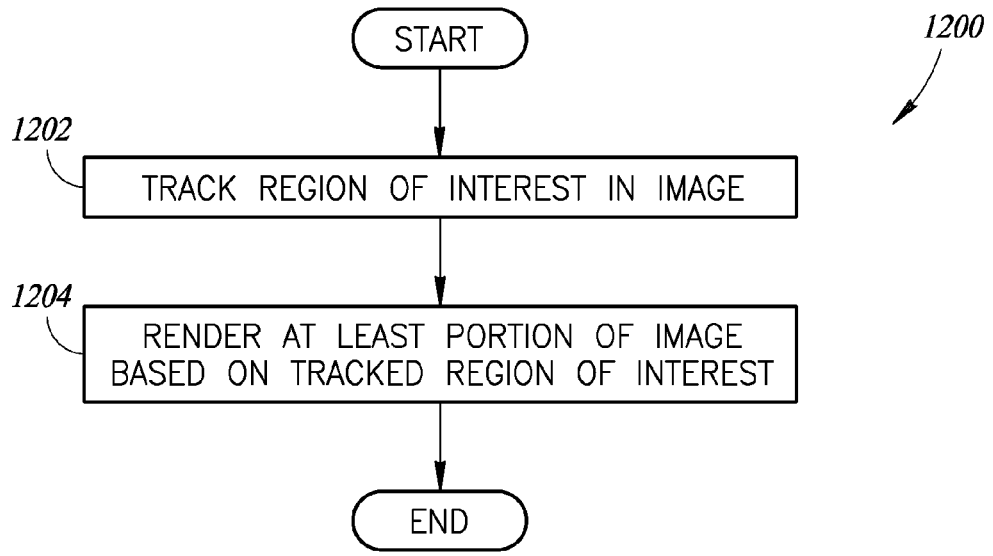
FIG. 12 is a flow diagram of a method of operation of an image processor system to render only a portion of a source image to reduce memory and processing requirements, according to one illustrated implementation.

FIG. 12 shows a method 1200 of operation for an image processor system to render or decode a portion of an image. At 1202, the at least one processor of the image processor system tracks a region of interest (ROI) of the image. At 1204, the at least one processor renders or decodes at least a portion of the image based on the tracked ROI.

Figure 14:
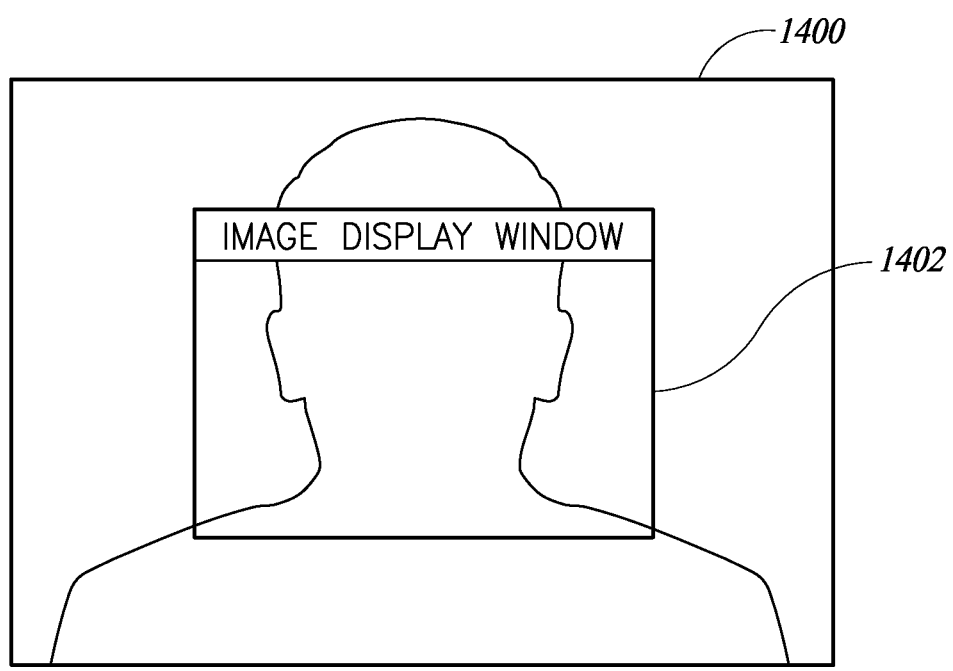
FIG. 14 is a schematic diagram of an image and an image display window which is smaller than the image, according to one illustrated implementation.

For example, as shown in FIG. 14 discussed below, if an image is displayed within a windowing system at 100%, only part of the image may fit inside the window. The portion of the image within the windowing system may be designated as the ROI. Thus, only tiles which intersect the ROI need to be processed. This functionality allows for both significant memory savings as well as faster rendering because less tiles need to be allocated and run through the filter chain.

Figure 13:
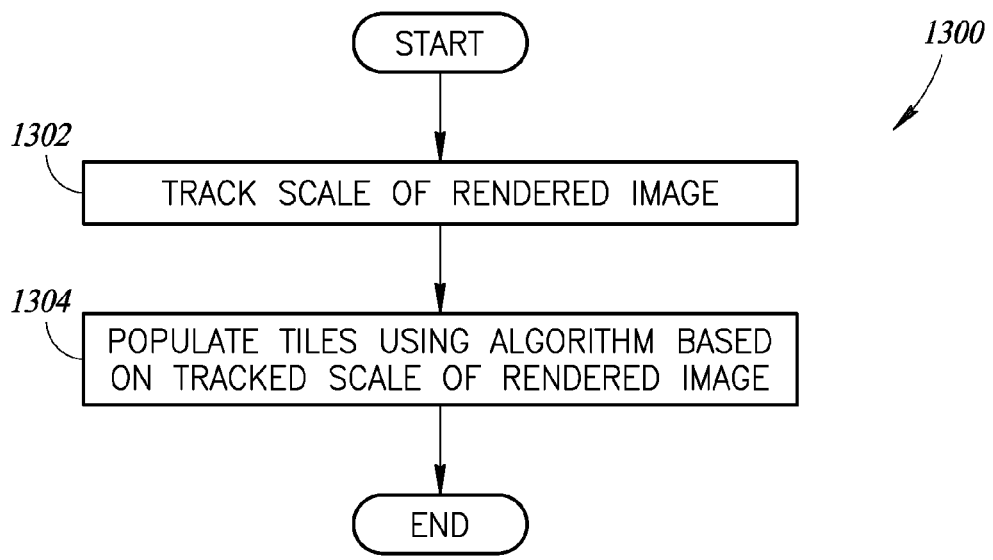
FIG. 13 is a flow diagram of a method of operation of an image processor system to populate tiles for processing based at least in part on a tracked scale of an image, according to one illustrated implementation.

FIG. 13 shows a method 1300 of operation for an image processor system to allow images to be rendered significantly faster. At 1302, the at least one processor tracks the scale at which the tiled image is rendered. The scale is a percentage greater than 0% and less than or equal to 100% of the full image resolution.

At 1304, the at least one processor may populate tiles using an algorithm based at least in part on the tracked scale of the tiled image. Examples are provided below.

As noted above, in some implementations the Tiled Image state machine 100 (FIG. 1) may include a specialized Image Source referred to herein as a Mip Source. The Mip Source utilizes "mipmap" scaling to store a power-of-two scaled version of the source image. A Mip-level may be calculated from the scale as follows:

$$\text{Mip-level} = \log_2(1/\text{scale})$$

For example, a scale of 1.0 (100%) results in a Mip-level of 0, a scale of 0.5 (50%) results in a Mip-level of 1, and a scale of 0.25 (25%) results in a Mip-level of 2. The Mip-level may be either rounded to the nearest integer to reduce memory usage or the Mip-level may be truncated to ensure that a Mip-level larger than a current scale is used to provide the best image quality. It is noted that other scaled Image Sources that use scaling algorithms other than power-of-two (Mip) scaling may be implemented. That is, Mip scaling is one of many scaling algorithms that may be used.

In addition to caching a scaled version of the image, the Mip Source (FIG. 1) may store the image data of the image in a format which is optimized for speed. An Image Source may not store its image data in a way which is optimal for populating tiles. For example, an Image Source may store its image data in CPU memory, while the Tiled Image state machine 100 (FIG. 1) runs its tiles in GPU memory. Transferring data between CPU and GPU memory spaces can often be slow. As such, in some implementations, the Mip Source may store its image data in GPU memory of the image processor system. Such allows the image data to be transferred once from the CPU memory in the Image Source into the GPU memory of the Mip Source. The initial data transfer may be relatively slow, but this ensures that re-running the Tiled Image is fast since all of the image data, from the Mip Source and the tiles in the Tiled Image, are stored in GPU memory. For example, if a user is constantly changing a filter in the filter chain, such as rapidly increasing or decreasing the exposure level of an image, having all of the image data stored in the GPU memory allows for rapid, real-time rendering.

When the Mip-level is greater than 0, the Image Source may use optimized scaling to populate tiles faster. For example, RAW images are usually encoded using a Bayer Color Filter Array (CFA). These images must undergo a complex demosaic algorithm which interpolates the Bayer CFA data into a red-green-blue (RGB) image. Demosaic algorithms are generally complex and slow. However, when the Image Source is populating a tile for Mip-X, where X is greater than 0, a faster demosaic "binning" algorithm may be used. Such "binning" algorithm may be much simpler and thereby much faster than a full demosaic algorithm. This allows images to be rendered on a display significantly faster than if the image were to be demosaiced into a full resolution image (i.e., Mip-0 image). Such functionality also allows for a significant memory savings. For example, a Mip-1 image contains ¼ of the pixels of a Mip-0 image, and a Mip-2 image contains only ¹⁄₁₆ of the pixels of a Mip-0 image.

FIG. 14 is a schematic diagram of an image 1400 and an image display window 1402 which is smaller than the image. As noted above, an ROI for the image 1400 may be set to coincide with the boundary of the image display window 1402. Thus, the ROI may be used to reduce the amount of memory needed to display a partial image. For example, a 100% (Mip-0) zoom of a 30 megapixel (MP) image may be displayed on a 3 MP screen. It is a waste of memory and time to render the entire 30 MP image if only 3 MP can be displayed at a time. Thus, the ROI for the tiled image is set to match the size and position of the image display window 1402. When the image 1400 is rendered, only the tiles which intersect the 3 MP area of the display window 1402 are run through the filter chain.

Figure 15:
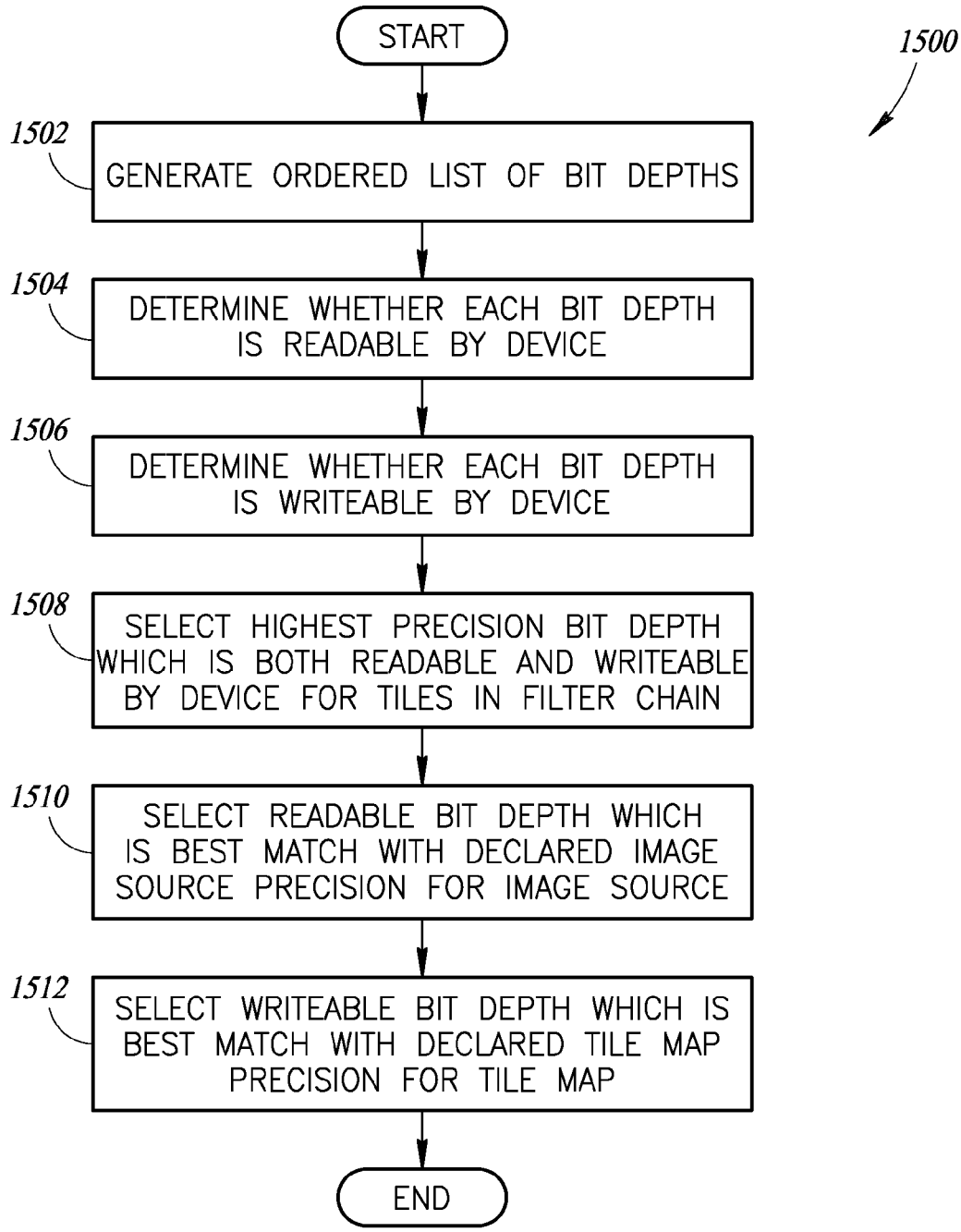
FIG. 15 is a flow diagram of a method of operation of an image processor system to adaptively maintain the best available precision during image processing, according to one illustrated implementation.

FIG. 15 is a flow diagram of a method 1500 of operation of an image processor system to adaptively maintain the best available precision while processing and outputting an image. Image data comes in varying amounts of precision or bit depth. For example, JPEG and PNG images have 8-bits per sub-pixel, while TIFF images may have 16-bits per sub-pixel, and RAW images may vary from 12-bits to 14-bits per sub-pixel. The Tiled Image pipeline of the present disclosure may provide functionality to maintain the best available precision at each point in the process, from the Image Source, to the tiles of the image filters in the filter chain, to the final output tiles of the Tile Map (e.g., output device).

Example bit depths include, but are not limited to: 8-bit (8 bits per sub-pixel, unsigned integer data); 10-bit (10 bits per sub-pixel, unsigned integer data); 16-bit (16 bits per sub-pixel, unsigned integer data); half-float (16 bits per sub-pixel, floating point data); and float (32 bits per sub-pixel, floating point data). Not all devices will support each of these bit depths.

At 1502, the at least one processor of the image processor system may generate an ordered list of bit depths (BIT_DEPTH_LIST), ordered from greatest precision to least precision. For example, in some implementations the bit depth list may include the following bit depths in order from highest precision to lowest precision: float, half-float, 16-bit, 10-bit, and 8-bit.

As discussed further below, the bit depth of the tiles in the filter chain need to be both readable and writeable since the image filters in the filter chain need to both read from and write to the tiles. However, the Image Source only needs a bit depth which is readable, and the Tile Map only needs a bit depth which is writable.

At 1504, when a device is initialized, the at least one processor of the image processor system may query the device to determine whether each of the bit depths (BIT_DEPTH) in the list of bit depths is readable by the device. The results of such query may be stored for subsequent use in the BIT_DEPTH_LIST, for example. At 1506, the at least one processor may query the device to determine whether each of the bit depths in the list of bit depths is writable by the device. The results of such query may be stored for subsequent use in the BIT_DEPTH_LIST, for example. Thus, the BIT_DEPTH_LIST includes data regarding whether the device is capable of reading from each of the bit depths in the BIT_DEPTH_LIST, and whether the device is capable of writing to each of the bit depths in the BIT_DEPTH_LIST.

At 1508, the at least one processor may select the highest precision bit depth which is both readable and writable by the device for the tiles in the filter chain, since the image filters in the filter chain need to both read from and write to the tiles. Such bit depth may be referred to as the "device bit depth." The tiles used to implement the filter chain should maintain the highest precision possible since the more filters which are run increases the chances for rounding errors. As such, lower precisions are unfavorable since they will introduce more errors and greater chances for banding and other undesirable artifacts.

The Image Source may declare a bit depth for its data. The tiles for the Image Source only need a bit depth which can be read from. When the Image Source populates a tile, the tile may be created using a bit depth that is appropriate for the Image Source's declared bit depth. For example, at 1510, the at least one processor may select one of the bit depths from the BIT_DEPTH_LIST determined to be readable by the device which best matches the Image Source's declared precision. For example, an Image Source which represents a 16-bit TIFF would declare its bit depth as "16-bit unsigned int." Suppose for example that the readable bit depths of a device in the BIT_DEPTH_LIST include 8-bit unsigned int, 16-bit half-float, and 32-bit float. In such a case, the at least one processor would select 16-bit half-float because 16-bit half-float is the closest match to 16-bit unsigned int declared by the Image Source. To achieve such functionality, the at least one processor may query the BIT_DEPTH_LIST until a precision is found which is closest the Image Source's declared precision and is readable by the device.

At 1512, the at least one processor may select one of the bit depths from the BIT_DEPTH_LIST determined to be writable by the device which best matches the Tile Map's declared precision. For example, most displays are capable of displaying 8-bit per sub-pixel color (24-bit RGB). In such instances, the Tile Map bit depth may be set to 8-bit. As another example, when outputting to a printer or a high bit depth file such as a 16-bit TIFF file, the Tile Map precision may be set to match the particular output device or component. To achieve such functionality, the at least one processor may query the BIT_DEPTH_LIST until a precision is found which is closest the Tile Map's declared precision and is writeable by the device.

The adaptable precision of the image processing pipeline discussed herein allows for reduced memory usage while maintaining high quality. For instance, an 8-bit JPEG may be processed in the filter chain using high precision tiles (e.g., float, half-float) and then rendered to 8-bit Tile Map tiles for display.

As discussed above, the filter chain working tiles are temporary and only two tiles are required to be stored in memory at a time. Such allows for high-precision processing using only the memory required for the 8-bit image plus two filter chain tiles. This is a significant memory savings over other methods which convert the entire 8-bit JPEG to 16-bit half-float or into 32-bit float and then process the entire high-precision image.

Using the implementations discussed above, mobile devices which support both read and write operations for the half-float bit depth are able to maintain image quality which is similar to that of desktop systems which support float bit depths. Further, devices which do not support higher precisions (e.g., float, half-float, 16-bit) are still able to run the image processing pipeline using lower bit depths (e.g., 10 bit, 8 bit). In such instances, the image quality will be reduced but the devices are at least capable of running the same image processing pipeline as other, higher precision device.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, solid-state drives, flash memory storage, CD ROMs, digital tape, and computer memory.

The various implementations described above can be combined to provide further implementations. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method of operation for an image processor system to process a source image, the method comprising:
    receiving, by at least one processor of the image processor system, image data from the source image;
    receiving, by the at least one processor, an image filter chain specification which specifies an ordered series of one or more image filters between an image filter chain input and an image filter chain output;
    determining, by the at least one processor, an output image size by forward iterating through each of the one or more image filters in the image filter chain specification from the image filter chain input to the image filter chain output, the output image size being a size of an output image output from the image filter chain specification;
    determining, by the at least one processor, geometries for a plurality of output tiles based at least in part on the determined output image size; and
    generating, by the at least one processor, a plurality of input tiles which each correspond to one of the output tiles by reverse iterating each of the output tiles through each of the one or more image filters in the image filter chain specification.

2. The method of claim 1 wherein determining an output image size comprises:
    providing, by the at least one processor, an input image size to at least a subset of the image filters in the image filter chain specification; and
    receiving, by the at least one processor, an output image size from the at least a subset of the image filters in the image filter chain specification.

3. The method of claim 1 wherein the image filter chain specification specifies at least a first image filter and a second image filter, and determining an output image size comprises:
    providing, by the at least one processor, an input image size to first image filter in the image filter chain specification;
    receiving, by the at least one processor, a first output image size from the first image filter in the image filter chain specification;
    providing, by the at least one processor, the first output image size to the second image filter in the image filter chain specification; and
    receiving, by the at least one processor, a second output image size from the second image filter in the image filter chain specification.

4. The method of claim 1 wherein generating a plurality of input tiles comprises:
    for each output tile,
        providing, by the at least one processor, position information and dimension information as input to each of the image filters in the image filter chain specification;
        receiving, from each of the image filters in the image filter chain specification, source rectangle information indicative of position information and dimension information for a source rectangle required to generate an image having the provided position information and dimension information; and
        receiving, from each of the image filters in the image filter chain specification, region of interest information indicative of a region of interest within the source rectangle.

5. The method of claim 1 wherein receiving image data from the source image comprises:
    determining, by the at least one processor, a source image region of interest based at least in part on the input tiles; and
    receiving, by the at least one processor, image data for the determined source image region of interest.

6. The method of claim 5, further comprising:
    decoding, by the at least one processor, the determined source image region of interest of the source image to provide the image data.

7. The method of claim 1, further comprising:
    populating, by the at least one processor, each of the input tiles with the image data from the source image;
    processing, by the at least one processor, each of the populated input tiles through each of the one or more image filters in the image filter chain specification; and
    generating, by the at least one processor, the output image by populating each of the output tiles with respective processed image data from each of the corresponding input tiles.

8. The method of claim 7 wherein processing each of the populated input tiles comprises:
    generating, by the at least one processor, an input working tile and an output working tile;
    storing, by the at least one processor, the input working tile and the output working tile in at least one nontransitory processor-readable medium;
    designating, by the at least one processor, the input working tile as a first input tile for a first one of the image filters;
    designating, by the at least one processor, the output working tile as a first output tile for the first one of the image filters;
    processing the first input tile of the first one of the image filters through the first one of the image filters;
    designating, by the at least one processor, the output working tile as a second input tile for a second one of the image filters; and
    designating, by the at least one processor, the input working tile as a second output tile for the second one of the image filters.

9. The method of claim 8, further comprising:
    prior to the generating of the input working tile and the output working tile,
        determining, by the at least one processor, a maximum width of the input tiles and the output tiles;
        determining, by the at least one processor, a maximum height of the input tiles and the output tiles; and
        determining, by the at least one processor, a size for the input working tile and the output working tile based at least in part on the determined maximum width and maximum height,
    wherein generating the input working tile and the output working tile comprises generating the input working tile and the output working tile based at least in part on the determined size for the input working tile and the output working tile.

10. The method of claim 1, further comprising:
    storing, by the at least one processor, the image data in a nontransitory processor-readable medium operatively coupled with a graphics processing unit (GPU).

11. The method of claim 1, further comprising:
    storing, by the at least one processor, a scaled version of the source image in a nontransitory processor-readable medium, wherein receiving image data comprises receiving the scaled version of the source image from the nontransitory processor-readable medium.

12. The method of claim 1, further comprising:
determining, by the at least one processor, whether at least one component of the image processor system is capable of reading from each of a plurality of bit depths; and
determining, by the at least one processor, whether the at least one component of the image processor system is capable of writing to each of a plurality of bit depths.

13. The method of claim 12 wherein receiving image data from the source image comprises receiving image data having a bit depth based at least in part on the determination of whether at least one component of the image processor system is capable of reading from each of a plurality of bit depths.

14. The method of claim 12, further comprising:
determining, by the at least one processor, which bit depth of the plurality of bit depths is the highest precision bit depth which the at least one component of the image processor system is capable of writing to and read from; and
setting the determined bit depth as a bit depth for each of the image filters in the image filter chain specification.

15. The method of claim 12, further comprising:
determining, by the at least one processor, a bit depth for an output component associated with the image processor system; and
setting a bit depth of the output tiles based at least in part on the determined bit depth for the output component.

16. The method of claim 15 wherein determining a bit depth for an output component comprises determining a bit depth for at least one of a display, a printer, or a file.

17. An image processor system to process a source image, the image processor system comprising:
at least one nontransitory processor-readable medium that stores processor-executable instructions; and
at least one processor communicably coupled to the at least one nontransitory processor-readable medium, the at least one processor:
receives image data from the source image;
receives an image filter chain specification which specifies an ordered series of one or more image filters between an image filter chain input and an image filter chain output;
determines an output image size by forward iterating through each of the one or more image filters in the image filter chain specification from the image filter chain input to the image filter chain output, the output image size being a size of an output image output from the image filter chain specification;
determines geometries for a plurality of output tiles based at least in part on the determined output image size; and
generates a plurality of input tiles which each correspond to one of the output tiles by reverse iterating each of the output tiles through each of the one or more image filters in the image filter chain specification.

18. The image processor system of claim 17 wherein the at least one processor:
provides an input image size to at least a subset of the image filters in the image filter chain specification; and
receives an output image size from the at least a subset of the image filters in the image filter chain specification.

19. The image processor system of claim 17 wherein the image filter chain specification specifies at least a first image filter and a second image filter, and the at least one processor:
provides an input image size to first image filter in the image filter chain specification;
receives a first output image size from the first image filter in the image filter chain specification;
provides the first output image size to the second image filter in the image filter chain specification; and
receives a second output image size from the second image filter in the image filter chain specification.

20. The image processor system of claim 17 wherein the at least one processor:
for each output tile,
provides position information and dimension information as input to each of the image filters in the image filter chain specification;
receives, from each of the image filters in the image filter chain specification, source rectangle information indicative of position information and dimension information for a source rectangle required to generate an image having the provided position information and dimension information; and
receives, from each of the image filters in the image filter chain specification, region of interest information indicative of a region of interest within the source rectangle.

21. The image processor system of claim 17 wherein the at least one processor:
determines a source image region of interest based at least in part on the input tiles; and
receives image data for the determined source image region of interest.

22. The image processor system of claim 21 wherein the at least one processor:
decodes the determined source image region of interest of the source image to provide the image data.

23. The image processor system of claim 17 wherein the at least one processor:
populates each of the input tiles with the image data from the source image;
processes each of the populated input tiles through each of the one or more image filters in the image filter chain specification; and
generates the output image by populating each of the output tiles with respective processed image data from each of the corresponding input tiles.

24. The image processor system of claim 23 wherein the at least one processor:
generates an input working tile and an output working tile;
stores the input working tile and the output working tile in at the least one nontransitory processor-readable medium;
designates the input working tile as a first input tile for a first one of the image filters;
designates the output working tile as a first output tile for the first one of the image filters;
processes the first input tile of the first one of the image filters through the first one of the image filters;
designates the output working tile as a second input tile for a second one of the image filters; and
designates the input working tile as a second output tile for the second one of the image filters.

25. The image processor system of claim 24 wherein, before the at least one processor generates the input working tile and the output working tile, the at least one processor:

determines a maximum width of the input tiles and the output tiles;
determines a maximum height of the input tiles and the output tiles; and
determines a size for the input working tile and the output working tile based at least in part on the determined maximum width and maximum height,
wherein the at least one processor generates the input working tile and the output working tile based at least in part on the determined size for the input working tile and the output working tile.

26. The image processor system of claim 17 wherein the at least one processor comprises at least one graphics processing unit (GPU), and the at least one nontransitory processor-readable medium comprises at least one nontransitory processor-readable medium operatively coupled to the at least one GPU, and wherein the at least one processor:
stores the image data in the at least one nontransitory processor-readable medium operatively coupled to the at least one GPU.

27. The image processor system of claim 17 wherein the at least one processor:
stores a scaled version of the source image in the at least one nontransitory processor-readable medium; and
receives the scaled version of the source image from the at least one nontransitory processor-readable medium.

28. The image processor system of claim 17 wherein the at least one processor:
determines whether at least one component of the image processor system is capable of reading from each of a plurality of bit depths; and
determines whether the at least one component of the image processor system is capable of writing to each of a plurality of bit depths.

29. A method of operation for an image processor system to process a source image, the method comprising:
providing, by the at least one processor, an image filter chain specification which specifies an ordered series of one or more image filters;
determining, by the at least one processor, a size of an output image output from the image filter chain specification;
determining, by the at least one processor, geometries for a plurality of output tiles based at least in part on the determined size of the output image; and
generating, by the at least one processor, a plurality of input tiles which each correspond to one of the output tiles by reverse iterating each of the output tiles through each of the one or more image filters in the image filter chain specification.

30. The method of claim 29, further comprising:
populating, by the at least one processor, each of the input tiles with the image data;
processing, by the at least one processor, each of the populated input tiles through each of the one or more image filters in the image filter chain specification; and
generating, by the at least one processor, the output image by populating each of the output tiles with respective processed image data from each of the corresponding input tiles.

* * * * *